(12) United States Patent
Folea et al.

(10) Patent No.: US 8,165,292 B2
(45) Date of Patent: Apr. 24, 2012

(54) METHOD AND SYSTEM FOR SECURE DISTRIBUTION OF AUDIOVISUAL DATA ENCAPSULATED ACCORDING TO A PLURALITY OF TRANSPORT PROTOCOLS

(75) Inventors: Octavian Folea, Le Kremlin-Bicetre (FR); Didier Lesteven, Draveil (FR)

(73) Assignee: Nagra France (FR)

( * ) Notice: Subject to any disclaimer, the term of this patent is extended or adjusted under 35 U.S.C. 154(b) by 822 days.

(21) Appl. No.: 12/250,840

(22) Filed: Oct. 14, 2008

(65) Prior Publication Data
US 2010/0091887 A1    Apr. 15, 2010

(51) Int. Cl.
*H04N 7/167* (2006.01)
(52) U.S. Cl. ............ 380/201; 380/200; 369/84; 369/85; 705/57; 375/240.12; 360/60
(58) Field of Classification Search ........... 380/200, 380/201; 369/84, 85; 705/57; 360/60; 375/240.12
See application file for complete search history.

(56) References Cited

U.S. PATENT DOCUMENTS

| | | | | |
|---|---|---|---|---|
| 2001/0026561 | A1* | 10/2001 | Morris et al. | 370/487 |
| 2002/0172233 | A1* | 11/2002 | Oldenborgh et al. | 370/537 |
| 2007/0195822 | A1* | 8/2007 | Chen et al. | 370/476 |
| 2010/0128873 | A1* | 5/2010 | Karroumi et al. | 380/255 |

FOREIGN PATENT DOCUMENTS
WO    2005/032135    7/2005
* cited by examiner

*Primary Examiner* — Edan Orgad
*Assistant Examiner* — Roderick Tolentino
(74) *Attorney, Agent, or Firm* — DLA Piper LLP (US)

(57) ABSTRACT

Methods and systems for secure distribution of an original audiovisual stream constituted of a set of transport packets encapsulated according to a plurality of transport protocols suitable to be transmitted to a receiving device compatible with one of the said transport protocols include the steps of:

generating a protected audiovisual stream from the original stream by modifying at least one of the original transport packets, and a complementary stream including digital information suitable from the protected stream, reconstituting on the receiving device the original audiovisual stream from the protected stream as function of the complementary stream, wherein the protected audiovisual stream includes a set of modified transport packets that are different from the corresponding original transport packets at modification positions, and the modification positions are in the complementary stream, the modification positions being generated according to each transport protocol of the plurality of transport protocols of the original stream.

13 Claims, 4 Drawing Sheets

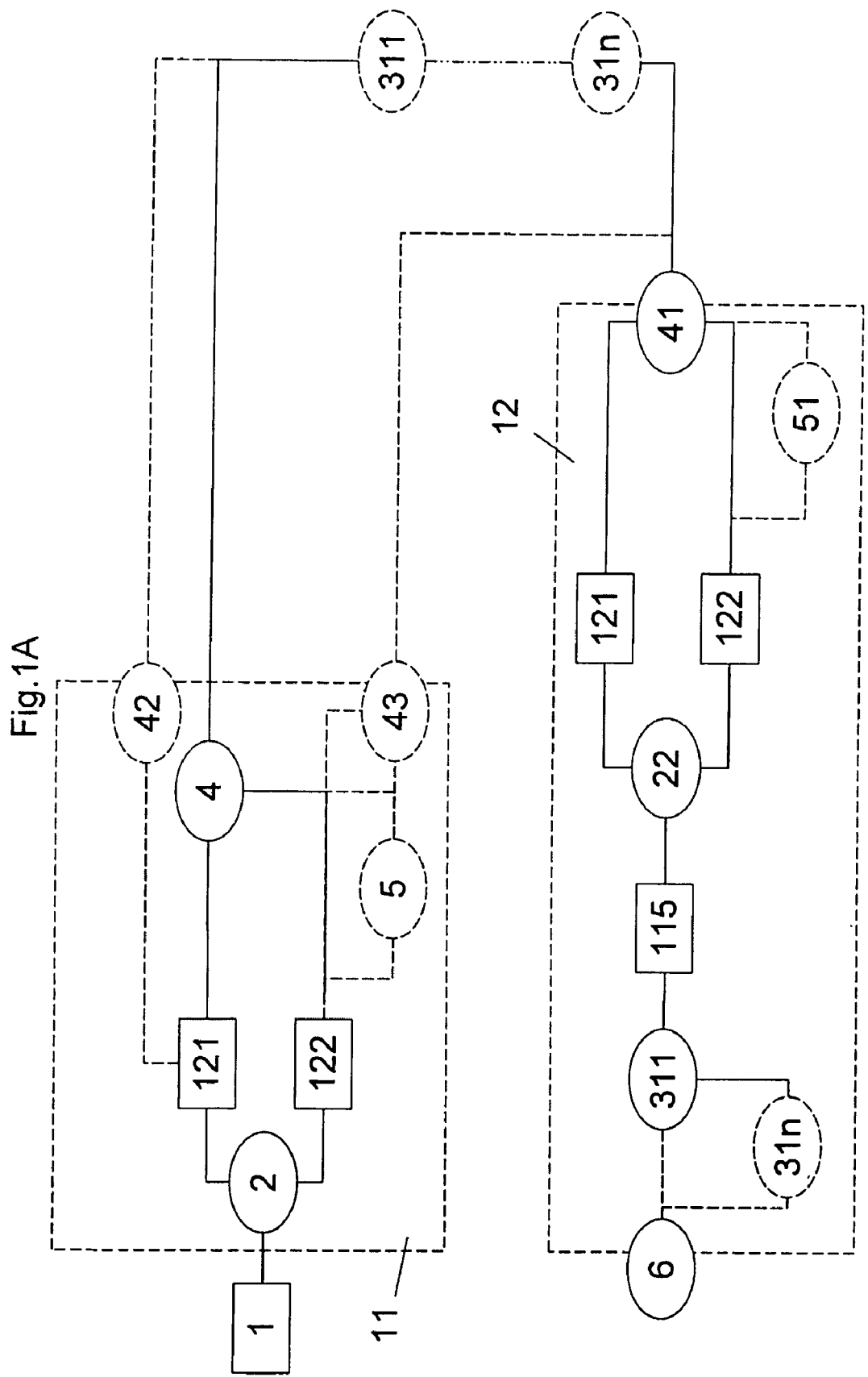

METHOD AND SYSTEM FOR SECURE DISTRIBUTION OF AUDIOVISUAL DATA ENCAPSULATED ACCORDING TO A PLURALITY OF TRANSPORT PROTOCOLS

TECHNICAL FIELD

This disclosure generally relates to the secure distribution of audiovisual data, more especially to methods and systems for secure distributing of audiovisual data encapsulated according to a plurality transport protocols to various devices connected to a network.

BACKGROUND

Various devices (STBs, PCs, mobile phones and other mobile entertainment devices) are used nowadays to consume the audiovisual content transported through multiple distribution infrastructures (satellite, radio, cable and IP networks). Providing unified commercial offers for all these technological platforms represents a key element for the service providers willing to differentiate themselves from their concurrence.

The technical means to deploy such cost-effective unified services are focusing on reusing hardware/software components on client side (chipsets for audiovisual decoding/de-multiplexing, smartcards for descrambling and the like) and to transport the unique audiovisual streams through various distribution infrastructure. This feature is made possible by encapsulating the audiovisual streams through multiple transport protocols. Known protocols for audiovisual data transport are UDP (User Datagram Protocol), RTP (Real Time Protocol) and RTSP (Real Time Streaming Protocol) for IP networks, as well as MPEG-2 TS (Transport Stream) for satellite, radio and cable networks.

For example, a digital TV service using satellite infrastructure for broadcasting would use MPEG-2 TS as transport protocol. The same operator wants to provide an IPTV (Internet Protocol Television) service for receiving devices connected to an IP network. In this situation, the audiovisual streams will be encapsulated according to two transport protocols: MPEG-2 TS to guarantee the transmission till the IP head-end infrastructures, and RTP or UDP for streaming the content to the devices connected to an IP network.

To protect the content transmission, most of the transport protocols contain specifications relating to security mechanisms: SRTP (Secure RTP) and ISMACryp (Internet Streaming Media Alliance) provides specification for content protection over RTP; DVB-CA (Common Scrambling Algorithm) specifies security mechanisms for content transport over MPEG-2 TS according to the DVB standard; IP SEC (Security) addresses the security of IP transport protocol.

Any of the security mechanisms designed for a specific transport protocol may be used to protect the content transmission. However, using such a mechanism a specific transport protocol would allow the de-protection of audiovisual stream only by the devices compliant to the specific transport protocol. Regarding the example presented above, distributing securely audiovisual streams to an IP-featured device would require a protection on IP level that would prevent a MPEG-2 TS featured device to access such an audiovisual stream.

This disadvantage is major: a service provider is forced to choose at the head-end of the distribution infrastructure a protection system that would strongly limit the choice of hardware devices for the end-user.

In addition, once the protection system was chosen, it will be difficult to access to the clear audiovisual stream at the level of the distribution chain, to insert a mark identifying the distribution nodes, for example, or to simply modify the content of the audiovisual streams.

It could therefore be advantageous to provide a method and system for securing the transport according to a plurality of transport protocols of an audiovisual stream to a device supporting any of the transport protocols. The same protected audiovisual stream would then be able to be de-protected at any level of the transport protocols, and not only at one specific transport protocol (the one where the protection process is applied).

In that situation, such a method would allow protection and de-protection of an audiovisual stream independent of the hierarchy of the transport protocols used for encapsulating the audiovisual content.

SUMMARY

We provide methods for secure distribution of an original audiovisual stream constituted by a set of transport packets encapsulated according to a plurality of transport protocols suitable to be transmitted to a receiving device compatible with one of the transport protocols, the method comprising the steps of:
  generating a protected audiovisual stream from the original stream by modifying at least one of the original transport packets,
  generating a complementary stream comprising digital information suitable to allow reconstruction of the original audiovisual stream from the protected stream,
  reconstituting the receiving device the original audiovisual stream from the protected stream as function of the complementary stream,
wherein the protected audiovisual stream comprises a set of modified transport packets that are different from the corresponding original transport packets at modification positions, and the modification positions are comprised in the complementary stream, and the modification positions are generated according to each transport protocol of the plurality of transport protocols of the original stream.

According to particular aspects:
  generating a second protected audiovisual stream comprises:
    an analysis step to generate a second list of transport containing the difference between the list containing the plurality of the transport protocols and the set of transport protocols addressed within the complementary stream, the second list being ordered in the ascending order of the hierarchy of the transport protocols that encapsulate the original stream;
    an updating step to generate second updated complementary packets comprising modification positions relative to all the transport protocols of the second list;
  generating protected audiovisual stream comprises:
    an analysis step to generate a list of transport protocols containing the plurality of the transport protocols, the list being ordered in the ascending order of the hierarchy of the transport protocols that encapsulate the original stream;
    a modification step to generate modified transport packets different from the corresponding original transport packets at modification positions and to generate complementary packets comprising modification positions generated relative to the first transport protocol of the list;

an updating step to generate updated complementary packets comprising modification positions relative to all the transport protocols of the list;
generating a protected audiovisual stream uses cryptographic algorithms;
generating a protected audiovisual stream comprises replacing at least one part of the original transport packets with different data to generated modified transport packets and storing the replaced parts within complementary transport packets;
the complementary stream is constituted of a set of transport packets compatible with at least one of the transport protocol;
the complementary stream is multiplexed within the protected stream;
the transmission of the complementary stream is protected by cryptographic means;
at least one of the transport protocols is compliant with one of the following specifications: IP, UDP, RTP or MPEG-2 TS.
We also provide systems comprising:
means to generate a protected audiovisual stream from the original stream by modifying at least one of the original transport packets;
means to generate a complementary stream comprising digital information suitable to allow reconstruction of the original audiovisual stream from the protected stream;
means to reconstitute on a receiving device the original audiovisual stream from the protected stream as function of the complementary stream;
means to generate a set of modified transport packets that are different from the corresponding original transport packets at modification positions;
means to generate the modification positions comprised in the complementary stream;
means to generate the modification positions according to each transport protocol of the plurality of transport protocols of the original stream.
According to particular aspects:
cryptographic means to generate the protected audiovisual stream;
the system comprises means to replace at least one part of the original transport packets with different data to generated modified transport packets and storing the replaced parts within the complementary transport packets;
the system comprises:
means to generate a list of transport containing the plurality of the transport protocols, the list being ordered in an ascending order of the hierarchy of the transport protocols that encapsulate the original stream;
means to generate modified transport packets different from the corresponding original transport packets at modification positions and to generate complementary packets comprising modification positions relative to the first transport protocol of the list;
means to generate updated complementary packets comprising modification positions relative to all the transport protocols of the list;
the system comprises:
means to generate a second list of transport containing the difference between the list containing the plurality of the transport protocols and the set of transport protocols addressed within the complementary stream, the second list being ordered in the ascending order of the hierarchy of the transport protocols that encapsulate the original stream;
means to generate second updated complementary packets comprising modification positions relative to all transport protocols of the second list; and
the receiving device is a computer, a set-top-box, a media center, a mobile phone, a PDA, a portable media player or any other hardware device with multimedia capabilities.

BRIEF DESCRIPTION OF THE DRAWINGS

Aspects of our systems and methods will become more apparent by describing in detail representative examples thereof with reference to the attached drawing figures, wherein:
FIGS. 1A and 1B show the structured view of a protection system to securely deliver multimedia content encapsulated according to a plurality of transport protocols.

DETAILED DESCRIPTION

Figure 1B:
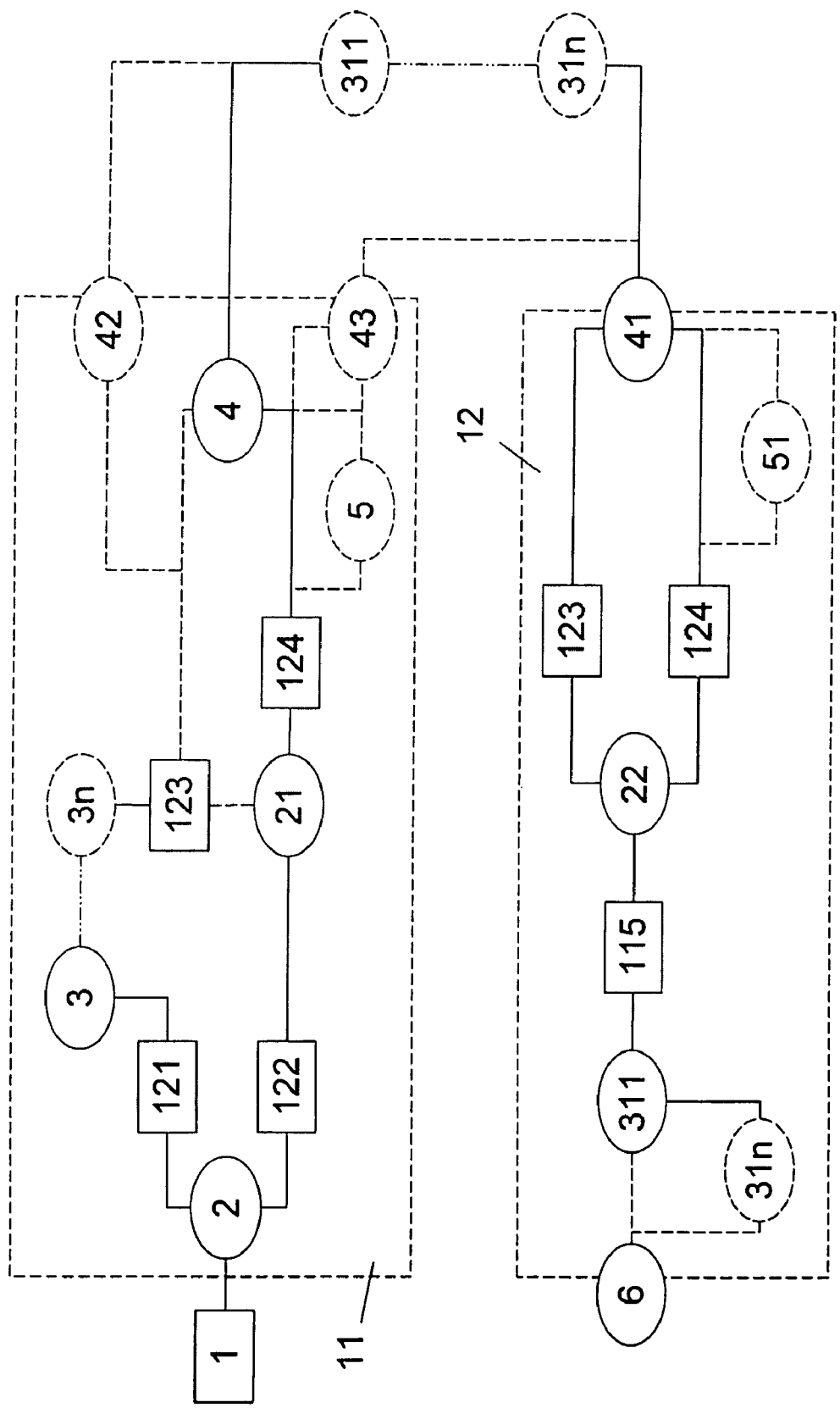

Hereinafter, selected representative examples will be described in detail with reference to the accompanying drawing figures.
In the following description, the matters defined in the description such as a detailed construction and elements are nothing but the ones provided to assist in a comprehensive understanding of our systems and methods. Thus, it is apparent that the subject matter of this disclosure can be carried out without those defined matters. Also, well-known functions or constructions are not described in detail since they are unnecessary.
In addition, identical references within the accompanying drawing figures address similar technical elements, unless a different meaning is clearly described.
FIG. 1A is a structured view of a protection system comprising: a content distribution server 11 and a receiving device 12 to playback the content distributed by the server 11.
The original content stream 1 is a multimedia stream containing video and audio flows, as well as rich media flows.
The audiovisual compression methods are known such standard ones: MPEG-2, MPEG-4 part 2, MPEG-4 AVC/H.264, MPEG-4 SVC or the like or ones largely used by industry: Windows Mediam™ Audio and Video, VP6 or the like.
The original stream 1 is constituted of a set of transport packets encapsulated according to a plurality of transport protocols.
According to a preferred and non-limitative structure, the transport packets are encapsulated according to the following transport protocols: first, the audiovisual content is packaged according to MPEG-2 TS (see ISO/IEC 13818-1), the resulting MPEG-2 TS being encapsulated according to RTP (see RFC3550) to output RTP packets.
The original content stream 1 is scrambled by a scrambling module 2 that generates as output:
a protected stream 121 comprising a set of modified transport packets that are different from the corresponding original transport packets at modification positions, and a complementary stream 122 that comprises the information needed by a descrambling module 22 to recover the original stream 1.

The functioning of the scrambling module 2 is detailed later in FIG. 2.

The format of the complementary stream 122 can either be proprietary or standard, for example, compliant with at least one of the transport protocols of the protected stream 121.

According to one aspect, transmission of the complementary stream 122 is protected by the protection module 5 using various cryptographic known means.

Both protected stream 121 and complementary stream 122 are transmitted by a transmission module 4 according to a proprietary or standard transport protocol.

According to one aspect, both protected stream 121 and complementary stream 122 are transmitted separately by a transmission module 42 and a transmission module 43, respectively, according to a proprietary or standard transport protocol.

According to another aspect, the protected stream 121 and the complementary stream 122 are multiplexed before being transmitted.

According to one aspect, the protected stream 121 is unpacked by an unpacking module 311 or by a plurality n unpacking modules 31n, after the transmission from the content distribution server 11 and before the reception on the receiving device 12. If the complementary stream 122 was mixed and transmitted through the same transport session as the protected stream 121 by the transmission device 4, it will be unpacked as well as the protected stream 121. These unpacking modules are compliant to the transport protocols used to encapsulate the original stream 1, the same as the ones used to encapsulate the protected stream 121. These unpacking operations are applied to allow the transmission of the protected stream 121 (and eventually the complementary stream 122) through a variety of network infrastructures (like satellite or cable regarding MPEG-2 TS, or IP regarding RTP) as well as to be adapted for consumption on a variety of receiving devices (like set-top-boxes for MPEG-2 TS, or IP media centers for RTP).

On the client side, the receiving device 12 recovers the protected stream 121 and the complementary stream 122 through the network interface 41.

The receiving device 12 is a computer, a set-top-box, a media center, a mobile phone, a PDA, a portable media player or any other hardware device with multimedia capabilities.

The network interface 41 is an IP (Internet Protocol), cable, terrestrial, satellite or mobile network interface, depending on which kind of network the two streams are transmitted.

According to one aspect, complementary stream 122 is de-protected by a de-protection module 51 compliant with the protection module 5.

Figure 3:
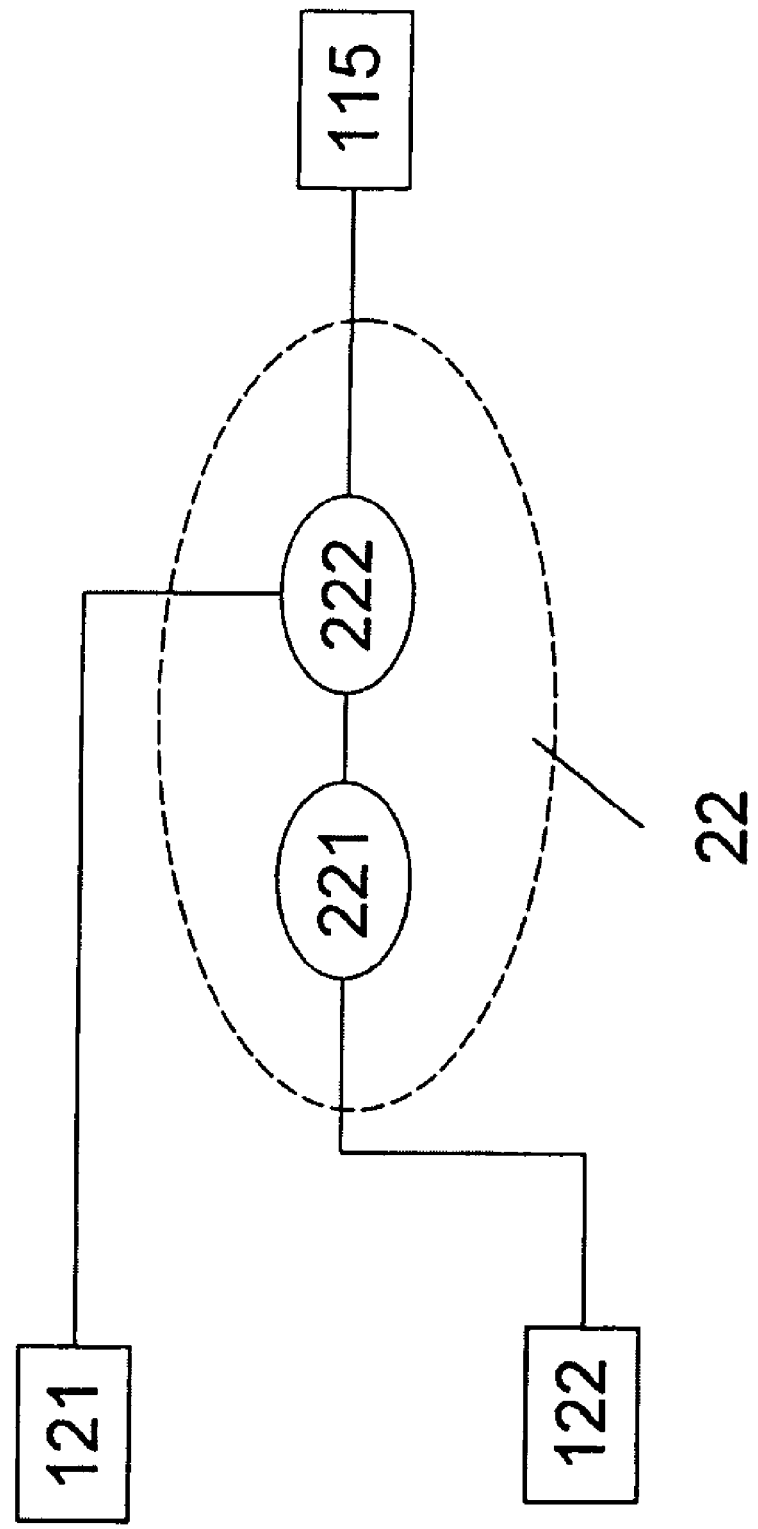
FIG. 3 shows a detailed description of a descrambling module integrated on client side into the protection system presented in FIG. 1.

The two streams are then processed by the descrambling module 21 to generate the original transport packets 115 in function of the complementary stream 122. The functions of the descrambling module 22 will be described later (FIG. 3).

The original transport packets 115 are then processed by an unpacking module 311 or by a plurality n unpacking modules 31n to obtain the video frames and/or the audio samples that will be decoded and rendered by the multimedia decoding interface 6.

The multimedia decoding interface 6 may be a software/hardware module performing audiovisual decoding, a multimedia player or an external device with various capabilities in terms of multimedia decoding and rendering.

According to one aspect, the unpacking module 311 or the plurality n unpacking modules 31n are software/hardware modules integrated within multimedia decoding interface 6.

FIG. 1B is a structured view of an alternative protection system. The difference from the protection system presented within the FIG. 1A is that the protected content 121 is packaged according to a transport protocol by an encapsulating module 3 or according to n transport protocols by n encapsulating modules 3n to determine a second protected stream 123. This second protected stream 123 is processed by a second scrambling module 21 to generate the second complementary stream 124. The second protected stream 123 and the second complementary stream 124 are then processed as the protected stream 121 and the complementary stream 122 in FIG. 1A.

The second scrambling module 21 is used in the situation when further encapsulation operations according to various transport protocol occur after the protection process. This allows a greater flexibility for the service provider, which can choose any time a new distribution infrastructure, without being oblige to re-apply the initial protection process.

Figure 2:
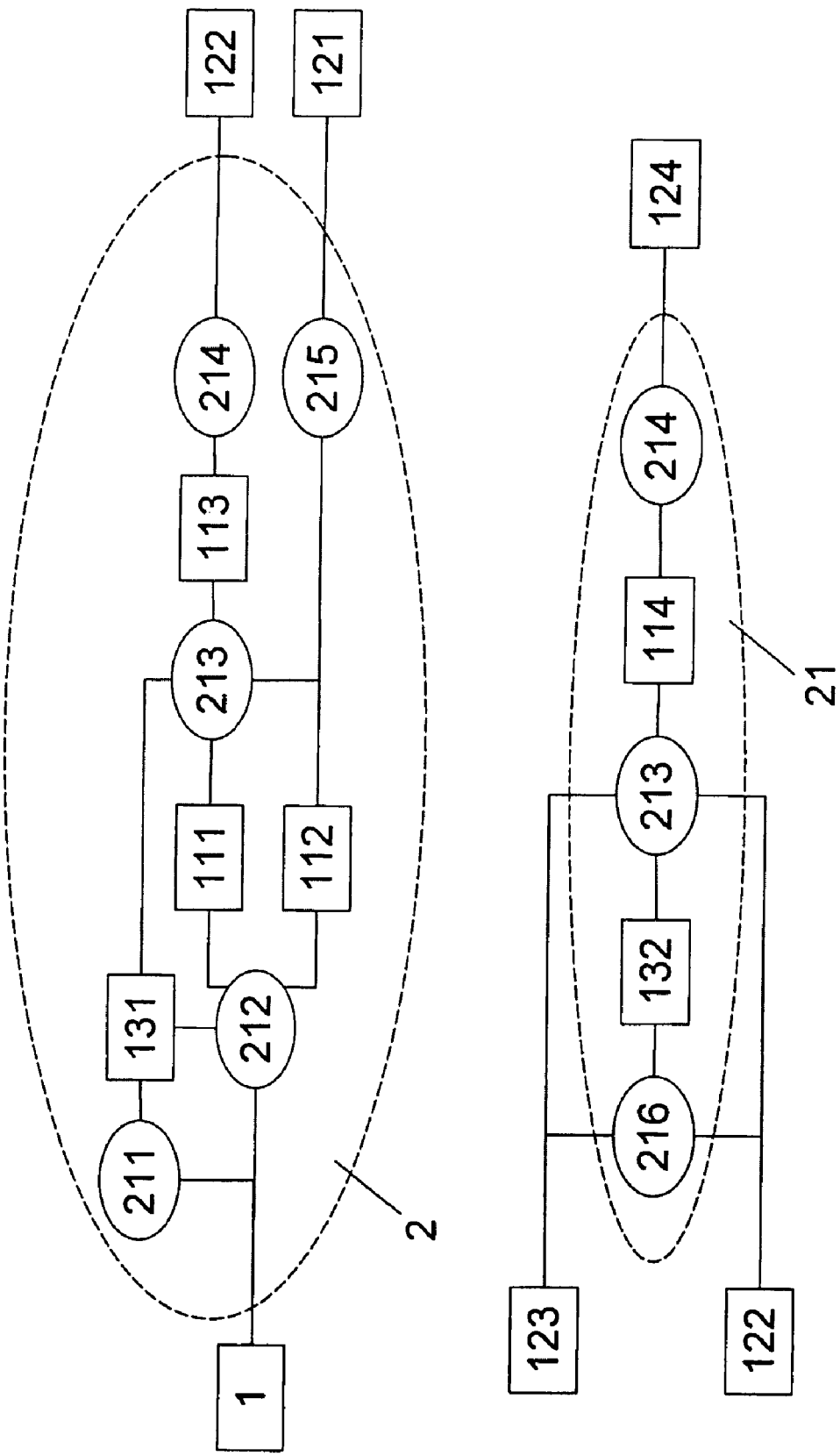
FIG. 2 shows a detailed description of a first and a second scrambling module integrated on server side into the protection system presented in FIG. 1.

FIG. 2 details the functioning of the scrambling module 2 and the second scrambling module 21.

The functioning of the scrambling module 2 comprises a set of operation steps that will be described below.

The analysis step 211 is applied on each of the original transport packets of the original stream 1 to determine the transport protocols used to encapsulate the original transport packets. The output is a list 131 of transport protocols where the first transport protocol in the list is the one situated at lowest-level on the transport protocol stack. The list 131 is then ordered in ascending order of the hierarchy of the transport protocols that encapsulate the original stream.

According to the preferred aspect, the result of the analysis step 211 is a list 131 containing two transport protocols: MPEG-2 TS and RTP.

The modification step 212 is applied to determine a modified transport packet 112 and a complementary packet 111 corresponding to each of the original transport packets of the original stream 1. The complementary packet 111 has any format and it may comprise digital information suitable to allow reconstruction of the original transport packets from corresponding modified transport packets 112.

The modification step 212 is applied as described below.

First, the data chosen to be modified is isolated from the original transport packet by determining the transport packet corresponding to the first transport protocol from the list 131. According to the preferred aspect, the MPEG-2 TS packet is chosen for modification.

Secondly, the offset within the chosen transport packet and the size of the binary data to be modified are determined. The offset and size are characterizing the modification position used by the descrambling module 22 to recover the original data and insert it back into the modified transport packet to determine the original transport packet. More than one modification position <offset, size> can be chosen to determine a plurality of binary data packets to be modified within the chosen transport packet.

Third, the binary data packets are extracted from the chosen transport packet by using the modification position (offset and the size). This modification position <offset, size> is stored within the complementary packet 111 for each binary data packet.

The type of the transport protocol (in the preferred aspect, MPEG-2 TS), or the transport protocol position within the list 131 of transport protocol (the value 1) can be also stored within the complementary packet 111.

The complementary packet 111 comprises also the synchronization information allowing the descrambling module 22 to select the modified transport packet 112 and a complementary packet 111 to recover the original transport packet.

According to the preferred aspect, the synchronization information comprises at least one of the following information related to the structure of the MPEG-2 TS packet or the PES packet: PID, stream_id, PTS, DTS or the like.

Alternative mechanisms to determine the synchronization information to be added inside the complementary packet 111 may be used. For example, the private data fields allowed by various transport protocols can be used to add a unique identifier within the modified transport packet 112 and stored within the complementary packet 111.

At the end of the modification step, the binary data packets are modified and inserted back into the original transport packet creating the modified transport packet 112. The data allowing the reconstruction of the original transport packet from the modified transport packet 112 is stored within the complementary packet 111.

According to one aspect, the binary data packets are modified by using various well known cryptographic techniques. The key or the keys issued further to the use of these cryptographic techniques allowing the reconstruction of the binary data packets are stored within the complementary packet 111.

According to another aspect, binary data packets are modified by replacing the binary data packets with different data within the modified transport packet 112. The original binary packets are then stored within the complementary packet 111.

According to one aspect, the set of the modified transport packets 112 allows the unpacking module 311 or the plurality n unpacking modules 31n to generate video frames and/or the audio samples to be decoded and rendered at a degraded visual and/or audible quality by the multimedia decoding interface 6. This can be achieved by implementing within the modification step 212 a modification method as the one described for example in WO2005/032135.

The updating step 213 generates an updated complementary packet 113 containing the information allowing the reconstruction of the original transport packet for any transport protocol in the list 131.

The updating step 213 is applied as following: for each transport stream in the list 131, excepting the first one (already used by the modification step 212), the offset, the size, the identification information of the protocol and the synchronization information are generated as described further the modification step 212 and combined with the content of complementary packet 111 to generate the updated complementary packet 113.

According to the preferred aspect, the updating step 213 is applied for RTP.

The packaging step 215 reassembles all the modified transport packets 112 to generate the protected stream 121 that is compliant with the transport protocols that the original stream 1 is compliant with.

The packaging step 214 reassembles all the updated complementary packets 113 to generate the complementary stream 122 that is compliant with a proprietary transport protocol or to at least one of the transport protocols that the original stream 1 is compliant with.

The functioning of the second scrambling module 21 is similar to the one of the scrambling module 2, only the analysis step 216 being slightly different of the analysis step 211.

Further to the analysis step 216, a second list 132 of transport protocols is generated to contain the difference between the list containing the plurality of the transport protocols and the set of transport protocols addressed within the complementary stream 122, the second list 132 being ordered in the ascending order of the hierarchy of the transport protocols that encapsulate the original stream.

The difference between the second updated complementary packets 114 and the corresponding updated complementary packets 113 is represented by the modification positions related to the transport protocols from the second list 132.

The output of the second scrambling module 21 is the second complementary stream 124 that resembles all the second updated complementary packets 114, and is compliant to a proprietary transport protocol or to at least one of the transport protocols that second protected stream 123 is compliant with.

FIG. 3 details the functioning of the descrambling module 22.

The analysis step 221 takes as input parameter complementary packets 114 or 113 of the complementary stream 122 or 124 and a fixed value indentifying a chosen transport protocol. This chosen transport protocol is the one supported by the unpacking module 311 or by the one of the n unpacking modules 31n. The identity of the chosen protocol will be used to extract from the complementary packet 114 or 113 the data containing the modification position (the offset and the size), the synchronization information and the data allowing the reconstruction of an original packet using a modified transport packet from the protected stream 121 or 123. This extracted data represents the output of this step.

The reconstitution step 222 uses the output data of the analysis step 221 to select the corresponding modified transport packet from the protected stream 121 or 123 and to reconstitute the original packet 115.

According to one aspect, the reconstitution step 222 applies various decryption techniques to reconstitute the original packet 115 from the corresponding modified transport packet using a decryption key or decryption keys from the output of the analysis step 222.

According to another aspect, the reconstitution step 222 replace the data from the modified transport to reconstitute the corresponding original packet 115 using the original data from the output of the analysis step 222.

Although the systems and methods have been described in connection with specific forms thereof, it will be appreciated that a wide variety of equivalents may be substituted for the specified elements described herein without departing from the spirit and scope of this disclosure as described in the appended claims.

The invention claimed is:

1. A method for secure distribution of an original audiovisual stream having a set of transport packets encapsulated according to a plurality of transport protocols suitable to be transmitted to a receiving device compatible with one of the transport protocols comprising:

generating a protected audiovisual stream from the original stream by modifying at least one of the original transport packets comprising:

an analysis step that generates a list of transport protocols containing the plurality of the transport protocols, the list being ordered in ascending order of a hierarchy of the transport protocols that encapsulate the original stream;

a modification step that generates modified transport packets different from the corresponding original transport packets at modification positions and generates complementary packets comprising modification positions generated relative to the first transport protocol of the list; and an updating step that generates updated complementary packets comprising modification positions relative to the transport protocols of the list;

generating a complementary stream comprising digital information suitable to allow reconstruction of the original audiovisual stream from the protected stream; and reconstituting on the receiving device the original audiovisual stream from the protected stream as a function of the complementary stream, wherein the protected audiovisual stream comprises a set of modified transport packets that are different from corresponding original transport packets at modification positions, the modification positions are in the complementary stream, and the modification positions are generated according to each transport protocol of the plurality of transport protocols of the original stream.

2. The method in accordance with claim 1, wherein generating a second protected audiovisual stream comprises:

an analysis step that generates a second list of transport containing the difference between the list containing the plurality of the transport protocols and the set of transport protocols addressed within the complementary stream, the second list being ordered in ascending order of a hierarchy of the transport protocols that encapsulate the original stream; and an updating step that generates second updated complementary packets comprising modification positions relative to the transport protocols of the second list.

3. The method in accordance with claim 1, wherein generating a protected audiovisual stream uses cryptographic algorithms.

4. The method in accordance with claim 1, wherein generating a protected audiovisual stream comprises replacing at least one part of the original transport packets with different data to generated modified transport packets and storing the replaced parts within complementary transport packets.

5. The method in accordance with claim 1, wherein the complementary stream has a set of transport packets compatible with at least one of the transport protocol.

6. The method in accordance with claim 1, wherein the complementary stream is multiplexed within the protected stream.

7. The method in accordance with claim 1, wherein transmission of the complementary stream is protected by cryptographic means.

8. The method in accordance with claim 1, wherein at least one of the transport protocols is compliant with at least one of the following specifications: IP, UDP, RIP or MPEG-2 TS.

9. A system comprising:

a generator of a protected audiovisual stream from an original stream by modifying at least one of original transport packets;

a generator of a complementary stream comprising digital information suitable to allow reconstruction of the original audiovisual stream from the protected stream; and a receiving device that reconstitutes the original audiovisual stream from the protected stream as a function of the complementary stream;

a generator of a set of modified transport packets that are different from corresponding original transport packets at modification positions;

a generator of the modification positions in the complementary stream;

a generator of the modification positions according to each transport protocol of a plurality of transport protocols of the original stream;

a generator of a list of transport containing the plurality of the transport protocols, the list being ordered in ascending order of a hierarchy of the transport protocols that encapsulate the original stream;

a generator of modified transport packets different from the corresponding original transport packets at modification positions and complementary packets comprising modification positions relative to a transport protocol of the list; and a generator of updated complementary packets comprising modification positions relative to the transport protocols of the list.

10. The system in accordance with claim 9, further comprising cryptographic means that generate the protected audiovisual stream.

11. The system in accordance with claim 9, further comprising means that replace at least one part of the original transport packets with different data to generated modified transport packets and storing the replaced parts within the complementary transport packets.

12. The system in accordance with claim 9, further comprising:

a generator of a second list of transport containing the difference between the list containing the plurality of the transport protocols and the set of transport protocols addressed within the complementary stream, the second list being ordered in ascending order of a hierarchy of the transport protocols that encapsulate the original stream; and a generator of second updated complementary packets comprising modification positions relative to transport protocols of the second list.

13. The system in accordance with claim 9, wherein the receiving device is a computer, a set-top-box, a media center, a mobile phone, a PDA, a portable media player or other hardware device with multimedia capabilities.

* * * * *